Patented Oct. 4, 1932

1,880,508

UNITED STATES PATENT OFFICE

HENRY B. SMITH, OF ROCHESTER, NEW YORK, ASSIGNOR TO EASTMAN KODAK COMPANY, OF ROCHESTER, NEW YORK, A CORPORATION OF NEW YORK

CELLULOSE ORGANIC ESTER COMPOSITION OF MATTER CONTAINING AN ESTER OF A BROMINATED MALONIC ACID

No Drawing. Application filed November 4, 1931. Serial No. 573,035.

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, artificial silk, varnishes or lacquers, coating compositions and the like.

One object of this invention is to produce compositions of matter which may be made into permanently transparent, strong, and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Still another object of my invention is to produce compositions of matter containing cellulose acetate which have a high degree of flexibility, softness, pliability and clarity. Other objects will become apparent to those skilled in the art to which this invention pertains.

While cellulose acetate has been known for decades, it has also been known that to utilize it in the various plastic arts it is necessary to mix therewith such plasticizing or conditioning agents as triphenyl phosphate, monochlornaphthalene or the like. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put, and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate and many substances which act as plasticizers for nitrocellulose are not sufficiently compatible with cellulose acetate to be used as plasticizers in cellulose acetate compositions.

I have discovered that valuable properties may be induced in and/or contributed to compositions containing cellulose organic esters, such as cellulose acetate, by adding thereto as a plasticizing compound an alkyl ester of a brominated malonic acid, namely an alkyl ester of monobromo-malonic acid or an alkyl ester of dibromo-malonic acid. These bromomalonic esters have the formulæ

$ROOC.CHBr.COOR$ and
$ROOC.CBr_2.COOR$, where R is an alkyl group containing from one to six carbon atoms. The particularly useful properties which the bromomalonic esters induce in or contribute to cellulosic compositions containing them are hereinafter enumerated.

By way of illustration of the manner in which the bromomalonic esters may be prepared, I give below methods of preparation of ethyl bromomalonate and ethyl dibromomalonate.

Ethyl bromomalonate $(C_2H_5.OOC.CHBr.COO.C_2H_5)$ may be prepared as follows: In a 12-liter flask, equipped with a stirrer, a dropping funnel, and a reflux condenser, are placed 3 liters of carbon tetrachloride and 3200 g. of ethyl malonate. Through the dropping funnel is added 3250 g. of bromine at a rate just sufficient to keep the solution boiling. The hydrobromic acid liberated is passed into water. After all the bromine has been added, the solution is refluxed over a steam bath until no more hydrobromic acid is given off. This requires about two hours. The solution is washed five times with two-liter portions of 5% sodium carbonate solution. The carbon tetrachloride is removed by distilling over a steam bath, and the residue is then transferred to a distilling flask and distilled under 15 mm. pressure, fractions being collected at 110–115° C., 115–120°, 120–125° and 125–150° C. These fractions are again fractionally distilled, and the fraction boiling at 115–125° is distilled a third time. The product boiling at 118–122° C. at 15 mm. pressure is collected as ethyl bromomalonate.

$(C_2H_5.OOC.CBr_2.COO.C_2H_5)$ may be prepared as follows: In a three-necked 5-liter flask, equipped with a stirrer, a reflux condenser with a tube at the top to carry away bromine fumes, and a dropping funnel, is placed a solution of 1 kg. of ethyl malonate in 1 kg. of carbon tetrachloride. The ethyl malonate should be dried over calcium chloride before using. A few cubic centimeters of bromine from a weighed amount of 200 g. is added through the dropping funnel. The deep red color should immediately change to a straw yellow. If the color fails to disappear, a strong light placed near the reaction flask will aid in starting the reaction. The rest of the bromine is then added through the dropping funnel at a rate sufficient to keep the reaction mixture gently refluxing. The hydrobromic acid liberated is passed into water. After all the bromine has been added, the flask is heated on a steam bath, with stirring, until no more hydrobromic acid gas is given off. The residue is then transferred to a distilling flask and the carbon tetrachloride distilled off with steam. When no more distillate can be obtained by steam, the residue is washed with 500 cc. of 10% sodium bisulfite solution, twice with 500 cc. portions of 10% sodium carbonate solution, then with water, and dried over calcium chloride. The dried product is distilled under reduced pressure, and the fraction boiling at 125–140° C. at 12 mm. pressure is redistilled. The product boiling at 113–114° C. at 7 mm. pressure is collected.

In order that those skilled in this art may better understand my invention I would state, by way of illustration, that for the manufacture of photographic films or other sheets my new compositions of matter may be compounded as follows: 100 parts of acetone-soluble cellulose acetate, i. e. cellulose acetate containing from 36% to 42% acetyl radical, approximately, is dissolved with stirring at atmospheric temperature in 300 parts, preferably 400 parts, by weight, of acetone. To this solution may be added from 10 to 50 parts by weight of ethyl bromomalonate or ethyl dibromomalonate, it being found preferable to employ from 30 to 50 parts thereof, approximately. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency (even where as much as 50 to 60 parts of ethyl bromomalonate or ethyl dibromomalonate per 100 parts of cellulose organic ester, such as cellulose acetate, is used) and very low inflammability, burning less rapidly, even, than ordinary newsprint. Films or sheets produced in accordance with my invention are quite tough and flexible. For instance, films of cellulose acetate plasticized with 30% to 50% (parts by weight based on the acetate) of ethyl bromomalonate had an initial flexibility of from 135% to 235% greater than that of film containing no plasticizer, and cellulose acetate films plasticized with 30% to 50% of ethyl dibromomalonate had an initial flexibility of from 135% to 165% greater than that of film containing no plasticizer. Furthermore, film so plasticized maintains flexibility in a superior fashion. For instance, a film containing 50% of ethyl bromomalonate maintained flexibility at 65° C. for 200 days, and a film containing 50% of ethyl dibromomalonate maintained flexibility at 65° C. for more than 303 days, whereas an unplasticized film became brittle in 30 days. This indicates that film so plasticized will withstand ordinary usage satisfactorily for many years. The sum total of the above advantageous properties of products produced from my new compositions is considerably in excess of that of products produced with what have previously been regarded as the better plasticizers.

Other similar solvents (instead of acetone) which are compatible with the cellulose acetate and my new plasticizers may also occur to those skilled in this art. In like manner these plasticizers may be compounded with other single organic esters of cellulose, such as cellulose propionate, butyrate and the like, or with mixed organic esters, such as cellulose aceto-stearate, cellulose aceto-proprionate, or cellulose aceto-malate, a suitable solvent which will dissolve both the celluosic derivative and the plasticizer being employed.

Inasmuch as my above described compositions of matter are useful in the production of films and sheets, it will be apparent that my new plasticizers may also be employed with advantage in the other branches of the plastic art. For instance, my above described compositions of matter may be employed in the manufacture of artificial silk by the dry spinning method. With the proper coagulating bath they may also be employed for wet spinning. It may be desired to employ compositions of different viscosity or evaporation characteristics, but this is a mere matter of changing the solvent proportion or adding evaporation retardents or other high or intermediate boiling constituents, as has been well known in the art for more than a decade. My novel plasticizers may also be employed with advantage in connection with a number of the known lacquer and varnish formulæ with which they may be found to be compatible. In such cases the plasticizer is usually first put into solution in the cellulose derivative solution, and if non-solvents are added for the purpose of cheapening the composition, they are added only to such an extent as will not precipitate the derivative from solution. Also the plasticizer is usually employed in larger amounts, such as from 50 to 60 parts, in compounding lacquers. Other uses within the scope of my invention will also suggest themselves to those skilled in the art and are to be included within the scope of the claims appended hereto.

Moreover, I have found that, upon the addition to cellulose acetate of approximately 100% of ethyl bromomalonate or ethyl dibromomalonate, quite unexpected compatibility of the plasticizer with the cellulose acetate exists and also that quite unexpected flexibility and plasticity of the final product results. Contrary to experience in most cases where such a large proportion of plasticizer is used, no exudation or crystallizing out of the plasticizer occurs. Such compositions have great utility where a highly flexible compound is desired, such as in the coating of a base (for instance, cloth or other fabric) in the production of artificial leather or the production of relatively thin sheets wherein more than the usual flexibility is important. Such a composition, if converted, for instance, into sheet form will be found to be supple and non-rigid, and to have the ability to conform readily to a surface upon which it may be placed, and this even at atmospheric temperatures.

These novel compositions of matter are produced by merely mixing the plasticizer with cellulose acetate and then adding sufficient of a common solvent, such as acetone, whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes, although we prefer to use 400 parts. Various high boilers or evaporation retardents, such as ethyl lactate, amyl acetate or the like may also be added if desired, as is well known in this art.

The compositions of matter so produced may then be coated into sheets in the usual way by depositing them upon plates or rolls and permitting the solvent to evaporate. If my novel compositions are to be employed in the manufacture of artificial leather, they may be coated upon, for instance, a cloth support and the solvent permitted to evaporate, or the cloth support may be caused to pass through the cellulose acetate-plasticizer composition and permitted to absorb the solution, the solvent in the coating being then permitted to evaporate. In either case, the solvent may, of course, be recovered if desired, by condensing the vapors, etc.

While above and in certain of the claims appended hereto, I have referred to the use of a plasticizer in approximately equal proportions, namely in a ratio of approximately 100%, it will be understood that within this terminology variations of from 10% to 15% less than 100% of plasticizer, and as much as 25% to 50% more than 100% of the plasticizer may, in some instances, be desirable.

What I claim as my invention and desire to be secured by Letters Patent of the United States is:

1. A composition of matter comprising an organic ester of cellulose and an alkyl ester of a brominated malonic acid.

2. A composition of matter comprising cellulose acetate and an alkyl ester of a brominated malonic acid.

3. A composition of matter comprising cellulose acetate and ethyl bromomalonate.

4. A composition of matter comprising cellulose acetate and ethyl dibromomalonate.

5. A composition of matter comprising 100 parts of cellulose acetate and about 10 to 100 parts, by weight, of an alkyl ester of a brominated malonic acid.

6. A relatively thin sheet comprising 100 parts of cellulose acetate and about 10 to 100 parts, by weight, of an alkyl ester of a brominated malonic acid.

7. A coated textile comprising a coating comprising cellulose acetate and an alkyl ester of a brominated malonic acid.

Signed at Rochester, New York, this 27th day of October, 1931.

HENRY B. SMITH.

CERTIFICATE OF CORRECTION.

Patent No. 1,880,508.  October 4, 1932.

HENRY B. SMITH.

It is hereby certified that error appears in the printed specification of the above numbered patent requiring correction as follows: Page 2, line 24, before the formula, insert the words "Ethyl dibromomalonate as the beginning of a new paragraph, the formula following on the same line; and that the said Letters Patent should be read with this correction therein that the same may conform to the record of the case in the Patent Office.

Signed and sealed this 10th day of January, A. D. 1933.

(Seal)

M. J. Moore,
Acting Commissioner of Patents.